United States Patent Office 3,842,000
Patented Oct. 15, 1974

3,842,000
PROCESS FOR REMOVAL OF AMMONIA FROM AQUEOUS STREAMS
Gaynor W. Dawson, Richland, Wash., assignor to Battelle Development Corporation, Richland, Wash.
Filed Oct. 7, 1971, Ser. No. 187,468
Int. Cl. B01d 15/04; C02c 1/44
U.S. Cl. 210—23
12 Claims

ABSTRACT OF THE DISCLOSURE

Ammonia in the nonionic state is removed from industrial or domestic waste waters by contact at pH 9-12 with a water-insoluble ion-exchange medium containing in its matrix a metal capable of forming a stable ammine complex with the ammonia to remove it. The ion-exchange medium may be in granular form or in the form of a membrane utilizing the ion-exchange medium as the substrate. The ion-exchange medium may be a synthetic organic resin saturated with methyl firmly bound therein or a denitrified hydrous oxide of Zr(III) or Ti(IV), having the metal incorporated in the matrix thereof. Regeneration of the ion exchange medium is carried out by contact with a buffered solution having a pH sufficiently low to strip off the complexed ammonia as $NH_4^+$. Ammonium ions may be continuously removed from the regenerate stream by incorporating a source of chloride ion in the stream and passing the stream through an electrolytic cell for production of chlorine gas which reacts with and degrades ammonium ions to nitrogen gas. Alternatively the chlorine gas can be reacted directly with the exchange medium. Saleable fertilizer compounds may also be produced from the ammonium ions in the regenerate stream.

BACKGROUND OF THE INVENTION

(1) Field of the Invention

This invention relates the use of to ion-exchange media for removal of ammonia in the nonionic state from highly dilute aqueous streams, to a process for treating such streams, and a process for regenerating the ion-exchange media.

(2) Prior Art Relating to the Disclosure

Municipal sewage effluent and many industrial waste waters contain ammonia and/or ammonium ions which, because of increasingly stringent water pollution laws and regulations and public awareness, must be significantly reduced or removed. Also in fertilizer plants employing catalytic reformers to produce ammonia, the aqueous waste streams contain high concentrations of ammonia which are valuable if reclaimed.

It is known to remove and reclaim ammonia from waste water through absorption of ammonia and/or ammonium ions on ion-exchange resins in the ionic hydrogen form as disclosed in U.S. Pat. No. 3,475,330. Dissolved salts contained in the waste streams, however, cripple the cationic resins and raise operating costs. U.S. Pat. No. 2,184,943 discloses the recovery of ammoniacal solutions of complex copper salts by absorbing the cupric-ammine complex on water-insoluble resins made by condensation of phenol sulphonic acid with formaldehyde. U.S. Pat. No. 3,207,577 discloses a process for the recovery of copper from waste waters containing copper ion from the spinning step of cupraammonium rayon fiber by passing an acidified solution containing the copper ions through a strongly acidic cation exchange resin in the ammonium form with subsequent regeneration of the resin with ammonium sulphate. It is also known from U.S. Pat. No. 3,332,737 that copper and hydrous oxides, such as hydrous zirconium oxide, have an affinity in the presence of ammonia.

Although the art indicates that ammonia can be removed by absorption of a cupric-ammine complex on highly copper selective resins, such a process removes only a fraction of the ammonia leaving unacceptably high effluent concentrations.

SUMMARY OF THE INVENTION

This invention is directed to a process for removing ammonia in the non-ionic state from aqueous solutions by ion-exchange media containing in their matrix a firmly bound metal capable of forming stable ammine-complexes with the ammonia and to processes for regenerating the ion-exchange media.

Certain of the objects of this invention are to provide: (1) an economical process for removal of ammonia in the nonionic state from domestic or industrial waste waters using ion-exchange media containing firmly bound metal in their matrix; (2) to provide a process utilizing synthetic ion-exchange resins in metal form for removal of ammonia in the nonionic state from highly dilute aqueous solutions thereof; (3) to provide a process utilizing hydrous oxide complexes containing firmly bound metal in their matrix for removal of ammonia in the nonionic state from highly dilute aqueous solutions thereof; (4) to provide a process for regeneration of such ionic exchange media by stripping ammonium ions from the ion-exchange media with a buffered solution containing chloride ion, the resulting regenerate stream being passed through an electrolytic cell for production of chlorine electrochemically which reacts with and degrades the ammonium ions to nitrogen gas for dissipation into the atmosphere; (5) to provide a process for regeneration utilizing direct chlorination of the exchange medium; (6) to provide a continuous process for removal of ammonia in the nonionic state from aqueous streams employing a membrane or membrane utilizing an ion-exchange medium in metal form as the substrate with continuous regeneration of the ion-exchange medium of the membrane or membrane.

DESCRIPTION OF THE PREFERRED EMBODIMENTS

(1) Preparation of the Ion-Exchange Media

Figure 1:
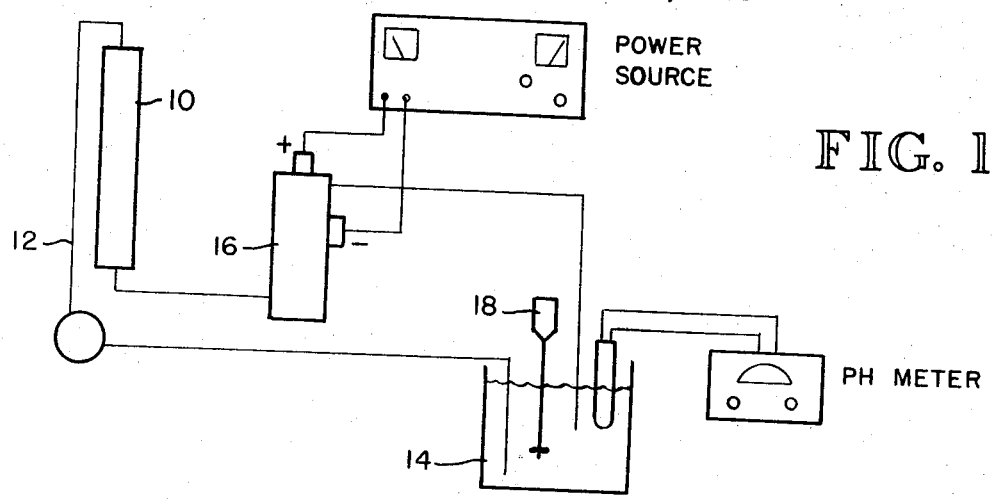
FIG. 1 is a flow diagram of one means of continuously removing ammonia from waste waters with regeneration of the ion-exchange medium.

The ion-exchange media for the removal of ammonia preferably comprise a material having a high selectivity for a metal which can be firmly bound in the matrix of the material, and which has the capability of forming stable ammine complexes with ammonia contained in aqueous streams. Any metal which can be held in a bound state and has a positive ammine-complex formation constant can be employed. Metal ions having positive values include Co(II), Co(III), Ni(II), Cu(I), Cu(II), Ag(I), Zn(II), Cd(II), and Hg(II). Differences in the constants of these species will not affect the mechanism of ammonia removal but will determine the equilibrium capacity of the medium. Cu(II) is the preferred metal form because of its relatively low cost and high ammine-complex formation constant.

Synthetic organic ion-exchange resins known and commercially available having a high selectivity for metals having the capability of forming stable ammine complexes with ammonia are generally weakly acidic, cation-exchange resins containing carboxylic acid and, in some instances, either acrylic or phenolic groups as their functional sites. The following synthetic resins are typical of those which may be used:

| Trade nomenclature: | Manufacturer |
| --- | --- |
| Dowex 50W–X8 | Dow Chemical Corporation. |
| Dowex A–1 | Do. |
| Chelex | Bio-Rad Laboratories. |
| Duolite CC–3 Duolite ES–63 | Diamond Shamrock Chemical Corporation. |
| IRC–50 | Rohm and Haas Chemical Corporation. |

The synthetic organic ion-exchange resins mentioned above have a high selectivity for Cu(II) and are saturated with a water-soluble cupric salt to load the resins. Chelating resins are best suited for use because of their selectivity and low release pH's. Copper loading is achieved either by batch rinsing or by elution with $CuSO_4$ solutions.

Several batches of bound-copper resin were produced for subsequent experimentation. Typically, 50 cc. of Dowex A–1 were slurried in a beaker with saturated $CuSO_4$. The resin beads rapidly took up the cupric ion and changed from their amber sodium form to a dark blue-green. A similar resin batch was made utilizing nickel as the bound metal. In the latter case, ammonia removal feasibility was tested through qualitative judgment of color change as a concentrated ammonia solution was passed through the resin. The formation of the bright blue ammine complex could clearly be seen and indicated that the resin would hold a nickel-ammonia complex.

Inorganic resinous materials such as trivalent, tetravalent or pentavalent metal species of water-insoluble hydrous oxides containing bound metal in the matrix thereof and having a positive ammine-complex formation constant are also valuable ion-exchange media for removal of ammonia in the nonionic state from waste water. Hydrous oxide inorganic absorbents or ion-exchangers are generally amorphous or microcrystalline solids containing one or more metal cations, oxide anions, hydroxide anions, varying amounts of water and some other exchangeable ions, either anions or cations, depending upon the charge of the specific ion or group of ions being separated and recovered. The hydrous oxide ion-exchangers used in this invention are substantially water-insoluble and are prepared by precipitation of the metal species in a solution of ammonium hydroxide which contains complexed metal.

A hydrous oxide medium containing bound copper(II) was prepared utilizing a tetravalent titanium or zirconium salt in aqueous solution, the optimum concentration being 0.2 molar. However, if a hydrous oxide of titanium is the medium of choice, a higher concentration of titanium can be achieved by using $TiCl_4$ as the source. To the solution of zirconium or titanium salt is added an equal volume of aqueous ammonia containing 50 g./l. $CuSO_4$. The resulting precipitate which contains the metal-ammine complex incorporated in the hydrous oxide matrix, is filtered, and dried in air at 85° C. for a 10 to 20 hour period. The glassy solid thus produced fractures to workable granules upon recontact with water; the grain size being a function of drying time and temperature. The drying temperature is generally not critical; however, the temperature should be low enough to prevent destruction of the hydrous character and ion-exchange characteristics of the material. Most hydrous oxide ion-exchangers exhibit higher ion-exchange capacities when dried at relatively low temperatures rather than at high temperatures which tend to impair or destroy their hydrous character. To activate hydrous oxide ion-exchangers in which copper is loaded in the cupric-ammine form it is necessary to strip off all the original ammonia. Activation can be accomplished by contact of the material with a buffer at a pH $\leq 8$ to transfer the complexed ammonia to $NH_4^+$ which can then be rinsed out or by direct contact with HOCl solution. The metal salt coprecipitated with the hydrous oxide may be any water soluble salt such as sulphate, chloride, etc. Hydrous oxides of Ti(IV) and Zr(IV) are preferred, although other inorganic hydrous oxides may be used, such as Th(IV), Sn(IV), Ta(V), Cr(III) and Nb (IV). Mixed oxides may also be used. Exchange media may also be formed through exchange of $Cu(NH_3)_4^{+2}$ onto a previously formed hydrous oxide and subsequent denitrification.

To verify this latter procedure, a batch of hydrous titanium oxide was produced as outlined in the preceding discussion with the exception that ammonium hydroxide was used to precipitate the titanium with no copper salt added. This yielded a relatively "pure" white product. The powder was dried and fractured into workable granules. These were packed in a separatory funnel to which a concentrated solution of $Cu(NH_3)_4SO_4$ was added. The dark blue solution was allowed to leach through the granules until equilibrium was reached. At this point, the granules had taken on a light blue color. Preparation in this manner left the resin loaded with ammonia. Hence, denitrification was required before the resin was ready for a loading cycle. Denitrification was achieved in one of two ways: (1) the resin was contacted with 25% hypochlorite solution allowing breakpoint chlorination to follow with the transforation of the ammonia molecules to innocuous nitrogen gas; and (2) the resin was slurried in a solution maintained at pH $<6$ so that the ammonia was changed to non-complexing ammonium ion rinsed away.

(2) Treatment of Waste Water Containing Ammonia

Ammonia contaminated water is passed through a bed or column of the ion-exchange medium, the ion-exchange medium being previously activated so that the metal contained therein removes the ammonia in the influent stream by formation of stable metal ammine complexes. The influent stream, prior to passage through the bed or column of ion-exchange medium, is adjusted to a pH range of about 9–12.

In the case of domestic sewage effluent, secondary line clarification for phosphate removal normally raises the stream pH above 11, thus the high pH stream is available at no additional cost. Many industrial waste streams involving high ammonia concentrations, such as the ammonium carbonate streams resulting from ammonia production, are generally at a pH of 6 to 7 and require pH adjustment by suitable means such as lime coagulation prior to passage of the waste stream through the ion-exchange column.

When the ion-exchange medium is no longer efficiently removing the ammonia in the influent stream the medium must be regenerated. Regeneration of the ion-exchange medium utilizes the pH dependence of the metal ammine complex. For example, with a cupric ammine complex, when the pH of the aqueous stream contacting the ion-exchange medium drops below about pH 8 the $NH_3 \rightleftharpoons NH_4^+$ equilibrium begins to favor $NH_4^+$. Consequently, the complexed ammonia rapidly sloughs off the ion-exchange medium. Thus, the ion-exchange medium may be regenerated by contact with an aqueous stream having a pH $\leq 8$ and preferably pH 5–7. The acid solution is contacted with the ion-exhange medium for a sufficient length of time to displace the complexed ammonia from the ion-exchange medium. The regeneration process for the ion-exchange medium is dependent upon the particular acid used for the regenerant. Sulphuric acid is a preferred regenerant, however, nitric acid, phosphoric acid, or hydrochloric acid may be used.

The ammonium ions contained in the regenerate stream must be disposed of in a way relatively innocuous to the environment. A portion of the ammonium ion contained in the regenerate stream, particularly if the regenerate stream contains added sulphuric acid to reduce the pH thereof, forms ammonium sulphate which is a useable fertilizer compound.

A preferred method of disposing of the stripped ammonium ions from the ion-exchange medium is to add a source of chloride ion, such as sodium chloride, to the regenerate stream and pass the stream through an electrolytic cell for the electrochemical production of chlorine. It has long been known that ammonia, in the presence of excess chlorine, is degraded to $N_2O$ gas through chloramine intermediates as illustrated by the following equations:

(1) $NH_3 + HOCl \rightarrow NH_2Cl + H_2O$ (2) $NHCl + HOCl \rightarrow NHCl_2 + H_2O$ (3) $NHCl_2 + NH_2Cl + HOCl \rightarrow N_2O + 4HCl$ Further side reactions continue to operate on the $N_2O$ until nitrogen gas becomes the major product. The product hydrochloric acid returns chloride ion to the regenerate solution. The overall balance shows only a net loss of electrons for the total regeneration process. By this regeneration process ammonium ions contained in the regenerate stream are removed as an innocuous gas, nitrogen. A buffered stream having a pH of 4 to 7 is preferably used to strip off complexed ammonia from the ion-exchange medium. A preferred buffer for the pH 5–7 range is potassium acid phosphate-disodium phosphate having a pH of 6.8. Common buffers of low pH such as acetates and citrates were found to be too strong as complexing agents and stripped the complexed metal such as copper from the ion-exchange medium. Phthalates could not be dissolved in the presence of concentrated sodium chloride. Direct contact of the chlorine solution to the resin will also regenerate the medium and avoids the necessity of dropping the pH.

A preferred method of operating the process for continuous removal of ammonia from waste waters is to adjust the waste water influent stream to pH 9–12 and pass the influent stream through a column 10 of ion-exchange medium at rates of 10 to 20 bed volumes per hour. The bound metal in the matrix of the ion-exchange medium holds up ammonia through formation of metal ammine complexes. Upon breakthrough the column is transferred over to a regeneration cycle which may be continuous as illustrated in FIG. 1. A regenerate stream 12 such as a phosphate buffered-sodium chloride solution at a pH of 6.5–7.0 is pumped out of a contact tank 14 through column 10 into an electrolytic cell 16 and back to contact tank 14 in a continuous mode. Agitation of the contact tank by a stirrer 18 or other suitable means is maintained to effect release of dissolved chlorine gas formed in the cell. If a synthetic organic resin is used as the ion-exchange medium the regeneration cycle is preferably done in two steps to eliminate contact of the resin with hypochlorite solution. In this event, several column volumes of buffer-salt regenerate are run through the column-cell arrangement and stored. A similar regenerate stream could be employed, if needed, to eliminate any remaining ammonia. The regenerate streams are then run in a loop from the cell to the contact tank and back again. Once the ammonia is eliminated the regenerate streams are allowed to start to release excess chlorine. In this manner all resin contact with streams containing hypochlorite are minimized and needless resin attrition eliminated.

A preferred method for the continuous removal of ammonia from waste waters employs one or more membranes utilizing the aforementioned ion-exchange media as the substrate. The influent side of the membrane is contacted with the waste stream adjusted to pH 9–12 and preferably to a pH of about 10.5. The regenerate side of the membrane is continuously washed with an aqueous regenerate stream buffered to a pH $\leq 8$. The ammonia is picked up on the influent side of the membrane by formation of metal ammine complexes such as the cupric-ammine complex. The low pH regenerate stream on the regenerate side of the membrane dislodges the ammonia and circulates it as ammonium ions. The regenerate stream may be continuously stripped of ammonium ions by the process mentioned previously, that is, by the addition of chloride ion and passage of the resulting stream through an electrolytic cell for production of chlorine and subsequent degradation of ammonium ions. Alternatively the solution containing ammonium ions can be maintained at a lower pH through automatic pH control by addition of phosphoric acid or sulphuric acid for production of saleable fertilizer compounds. For example, a percentage of the stream may be bled off and magnesium added to precipitate $MgNH_4PO_4$ which is saleable fertilizer compound. The supernatant may be recycled to the regenerate stream for reuse.

Several such membranes were produced. Hydrous titanium and zirconium oxides were pulverized and passed through a $-325$ sieve. The talc like product was then mixed with a solution of Kynar (20% divinylidene fluoride in dimethyl acetamide) in approximately 1:1 proportions. This pasty mixture was then spread with a spatula over a thin piece of cheesecloth. The membrane was allowed to dry for a short period of time and was then submerged in water to complete the polymerization without allowing it to dry to the point of cracking.

Figure 2:
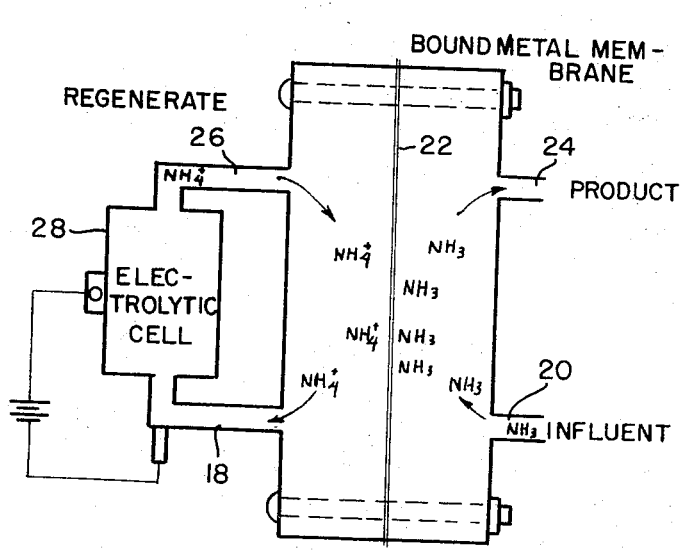
FIG. 2 is a flow diagram for continuous removal of ammonia from waste streams employing one or more membranes utilizing ion-exchange media as the substrate.

Due to the nonionic state of the ammonia during transfer no charge deficit develops so that no additional driving forces are required. The driving force through the membrane is merely by the pH differential and the complex forming substrate. A flow-diagram of such a process is shown in FIG. 2 where influent containing ammonia enters conduit 20, contacts the membrane 22 utilizing bound metal ion-exchange media as the substrate. The metal removes the ammonia contained in the influent stream. The stream from which the ammonia has been removed exits through conduit 24. On the opposite or regenerate side of the membrane a regenerate stream buffered to a pH of 5–7 and containing a source of chloride ion, such as sodium chloride, enters through conduit 26 and contacts the regenerate side of the membrane 22. Complexed ammonia is stripped off the ion-exchange media as ammonium ions. The ammonium ions in the regenerate stream then pass into an electrolytic cell 28 wherein chlorine is generated electrochemically, the chlorine reacting with the ammonium ions to produce nitrogen gas which is dissipated into the atmosphere.

It is preferable to use the above regeneration system with the inorganic ion-exchange media as contact of synthetic organic resins with hypochlorite solutions, generated by reaction of chlorine gas with water, tends to degrade and shorten the life of synthetic resins considerably. Alternatively, if a synthetic organic resin is used regeneration can be handled in two phases with no chlorine treated regenerate recycled to the ion-exchange column. While this requires meticulous control or the use of enough strong buffer to achieve complete ammonia stripping before any electrolytic treatment, it can be accomplished.

Figure 3:
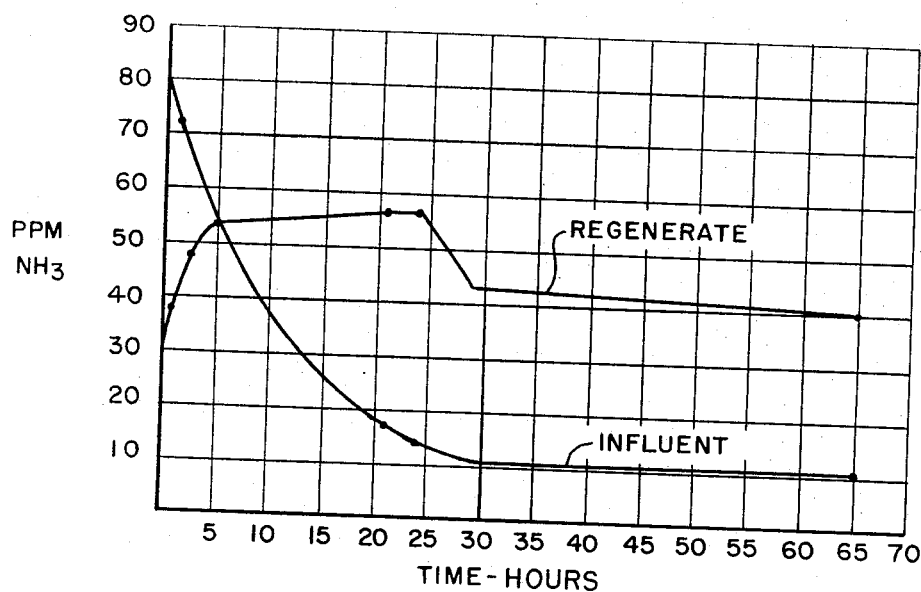
FIG. 3 is a graph of ammonia loss in an influent stream and ammonia pickup in a regenerate stream employing a system such as illustrated by FIG. 2.

Several membranes were produced as described earlier. These were then tested for selectivity in transferring non-ionic ammonia. A typical run consisted of sealing the membrane in a 4″ x 4″ plexiglass cell similar to that illustrated in FIG. 2. Lime clarified secondary effluent was then adjusted to pH 11 and circulated continuously on the influent side while the regenerate side was continuously washed with a recirculating phosphate buffer solution at pH 6.5. The graph of FIG. 3 illustrates a typical removal curve showing both the ammonia loss of the influent and the ammonia pickup in the regenerate buffer. After the run, the buffer solution was treated with MgO to form a white precipitate. X-ray analysis showed this powder to be $MgNH_4PO_4$, a saleable fertilizer compound.

The inorganic ion exchangers are considerably less expensive than the organic, synthetic, ion-exchange resins, and, for that reason, are preferably employed to keep operating and maintenance costs as low as possible. Non-ionic exchange by the present process shows no response to increased amounts of dissolved salts in the influent stream, thereby offering advantages for many industrial applications as well as the treatment of municipal sewage effluent.

The embodiments of the invention in which a particular property or privilege is claimed are defined as follows:

1. A process for separating ammonia in the non-ionic state from aqueous streams, comprising:
   (1) adjusting the stream to pH 9–12 so that a substantial amount of ammonia in the stream is in the exchangeable, non-ionic form, and
   (2) contacting the stream with a water-insoluble ion exchange material having metal cations firmly bound in its matrix to prevent any substantial leaching of the metal cations from the ion-exchange material, the metal cations having a positive ammine complex formation constant and forming ammonia complexes by attachment of non-ionic ammonia to the metal cations, thereby removing the non-ionic ammonia from the aqueous stream.

2. The process of claim 1 wherein the metal cations are selected from the group consisting of Co(II), Co(III), Ni(II), Cu(I), Cu(II), Ag(I), Zn(II), Cd(II) and Hg(II).

3. The process of claim 1 wherein the ion exchange material is an organic synthetic resin material having an open chelate structure saturated and bound with Cu(II).

4. The process of claim 1 wherein the ion-exchange material is a denitrified, water-insoluble, inorganic hydrous oxide exchanger containing Cu(II) firmly bound in the matrix thereof.

5. The process of claim 4 wherein copper is incorporated in the hydrous oxide exchanger by precipitating the hydrous oxide with an excess of ammonia in the presence of a water soluble cupric salt, drying the precipitate at a temperature lower than that at which its hydrous character is destroyed and denitrifying the dried hydrous oxide ion-exchange material.

6. The process of claim 4 wherein the inorganic hydrous oxide exchanger contains the hydrous oxide of a metal selected from the group consisting of Zr(IV) and Ti(IV).

7. The process of claim 1 including regenerating the ion-exchange material by contacting it with a buffered regenerate stream having a pH less than or equal to 8 to strip off the complexed ammonia as ionic $NH_4^+$.

8. The process of claim 7 further including contacting the regenerate stream containing ionic $NH_4^+$ with excess chlorine gas to degrade the ionic $NH_4^+$ to nitrogen gas.

9. The process of claim 8 wherein chlorine gas is produced electrochemically by adding a source of chloride ion to the regenerate stream and passing an electric current through the regenerate stream in an electrolytic cell.

10. The process of claim 1 wherein the ion exchange material is utilized as the substrate of a formed membrane which the influent stream contacts.

11. A continuous process for the separation of non-ionic ammonia from aqueous streams, comprising:
    (1) adjusting the stream to pH 9–12 so that a substantial amount of ammonia in the stream is in the exchangeable, non-ionic form,
    (2) contacting the influent side of a membrane with the stream, the membrane comprising a binding agent in admixture with a particulate, water-insoluble, ion exchange material having metal cations firmly bound in the matrix of the ion-exchange material to prevent any substantial leaching of the cations therefrom, the metal cations having a positive ammine complex formation constant and forming ammonia complexes by attachment of non-ionic ammonia to the metal cations, removing the non-ionic ammonia from the stream, and
    (3) continuously washing the regenerate side of the membrane with a regenerate stream having a pH less than or equal to 8 to strip off the complexed ammonia as ammonium ions.

12. The process of claim 11 including continuously removing ammonium ions from the regenerate stream by adding a source of chloride ion thereto and passing an electric current through the regenerate stream in an electrolytic cell to produce chlorine gas which reacts with and degrades ammonium ions in the regenerate stream.

References Cited

UNITED STATES PATENTS

| | | | |
|---|---|---|---|
| 3,436,352 | 1/1969 | Revoir et al | 210—502 X |
| 3,033,641 | 5/1962 | Thomas | 210—38 X |
| 3,522,187 | 7/1970 | Kraus | 210—24 |
| 3,497,394 | 2/1970 | Berger | 210—502 X |
| 3,574,084 | 4/1971 | Bruce | 210—62 X |
| 3,433,841 | 3/1969 | Dern et al. | 210—24 |
| 3,499,537 | 3/1970 | Bittles | 210—510 |

THOMAS G. WYSE, Primary Examiner

U.S. Cl. X.R.

210—32, 38; 423—352